United States Patent

[11] 3,629,828

[72] Inventor Frederick M. Demer
Binghamton, N.Y.
[21] Appl. No. 822,580
[22] Filed May 7, 1969
[45] Patented Dec. 21, 1971
[73] Assignee International Business Machines Corporation
Armonk, N.Y.

[54] SYSTEM HAVING SCANNER CONTROLLED BY VIDEO CLIPPING LEVEL AND RECOGNITION EXCEPTION ROUTINES
4 Claims, 7 Drawing Figs.

[52] U.S. Cl. 340/146.3AG
[51] Int. Cl. G06k 9/00
[50] Field of Search 340/146.3

[56] References Cited
UNITED STATES PATENTS

| | | | |
|---|---|---|---|
| 3,177,352 | 4/1965 | Hamburgen | 340/146.3 X |
| 3,263,216 | 7/1966 | Andrews | 340/146.3 |
| 3,339,177 | 8/1967 | Hardin | 340/146.3 |
| 3,387,138 | 6/1968 | Greanias et al. | 340/146.3 X |
| 3,460,091 | 8/1969 | McCarthy et al. | 340/146.3 |
| 3,196,398 | 7/1965 | Baskin | 340/146.3 |
| 3,533,068 | 10/1970 | Hanaki et al. | 340/146.3 AH |

*Primary Examiner*—Maynard R. Wilbur
*Assistant Examiner*—Leo H. Boudreau
*Attorneys*—Hanifin and Jancin and Paul M. Brannen ABSTRACT: A character recognition system comprising a flying spot scanner with appropriate scanner controls for causing the scanner to execute a plurality of scanning modes, recognition data storage for storing the data received from the flying spot scanner, a recognition decoding section and a coded output section for providing outputs in accordance with the characters scanned. Particularly, the invention provides for incremental movement of the flying spot scanner beam governed by different levels of clipping level control to provide for location of the scanning beam with respect to the registration portion of a stylized character which is to be scanned; a data compression means which combines information in several different scanning areas into particular zones and stores the information; and means which will selectively provide one or more specifically located additional recognition scans as required over and above a normal number of recognition scans, to accommodate a few special characters.

INVENTOR
FREDERICK M. DEMER
BY Paul M. Brannen
AGENT

SYSTEM HAVING SCANNER CONTROLLED BY VIDEO CLIPPING LEVEL AND RECOGNITION EXCEPTION ROUTINES

BACKGROUND OF THE INVENTION

This invention relates to character recognition systems particularly designed for reading stylized characters. A significant number of optical character recognition applications are those in which the form of the characters and the quality of the printing are under the control of the user of the character recognition equipment. Past experience in optical character recognition development clearly indicates that these two characteristics of the input data greatly influence the cost and performance of the recognition equipment. With appropriate quality control of the above factors, the complexity of character recognition systems can be considerably reduced since apparatus required for handling a large variety of characters and also for contending with varying quality of the printing can be dispensed with.

SUMMARY OF THE INVENTION

Briefly described, the present invention utilizes a flying spot under scanner which is governed by different levels of clipping level control to provide for location of the scanning beam with respect to the registration portion of a stylized character which is to be scanned. The scanning information derived from the flying spot scanner is then supplied to a suitable data compression means which combines information in several different scanning areas into selected zones and stores the zoned scanning information. The zoned scanning information is then decoded and provided to a suitable coded output section. The use of stylized characters normally requires that scans be provided only at particular locations with respect to most of the characters. However, certain characters will require one or more additional recognition scans, and the system is constructed and arranged so tat one or more specifically located additional recognition scans over and above the normal number are provided, when the system requires it, to scan the several special characters which cannot be adequately scanned by the normal number of scans.

Accordingly, a principal object of the present invention is to provide an improved character recognition system for recognizing stylized characters having good print quality.

Another object of the invention is to provide an improved character recognition system of the flying spot scanner type in which the location of the registration portion of the character is readily obtained.

A further object of the invention is to provide an improved character recognition system in which the scanned data is compressed to provide a reduced amount of data which must be analyzed to determine the character which has been scanned.

A further object of the invention is to provide an improved character recognition system having a variable number of scans which are varied in accordance with the nature of the characters to be recognized.

The foregoing and other objects, features and advantages of the invention will be apparent from the following more particular description of a preferred embodiment of the invention as illustrated in the accompanying drawings.

BRIEF DESCRIPTION OF THE DRAWINGS

Similar reference characters refer to similar parts in each of the several views.

DETAILED DESCRIPTION OF THE DRAWINGS

Figure 1:
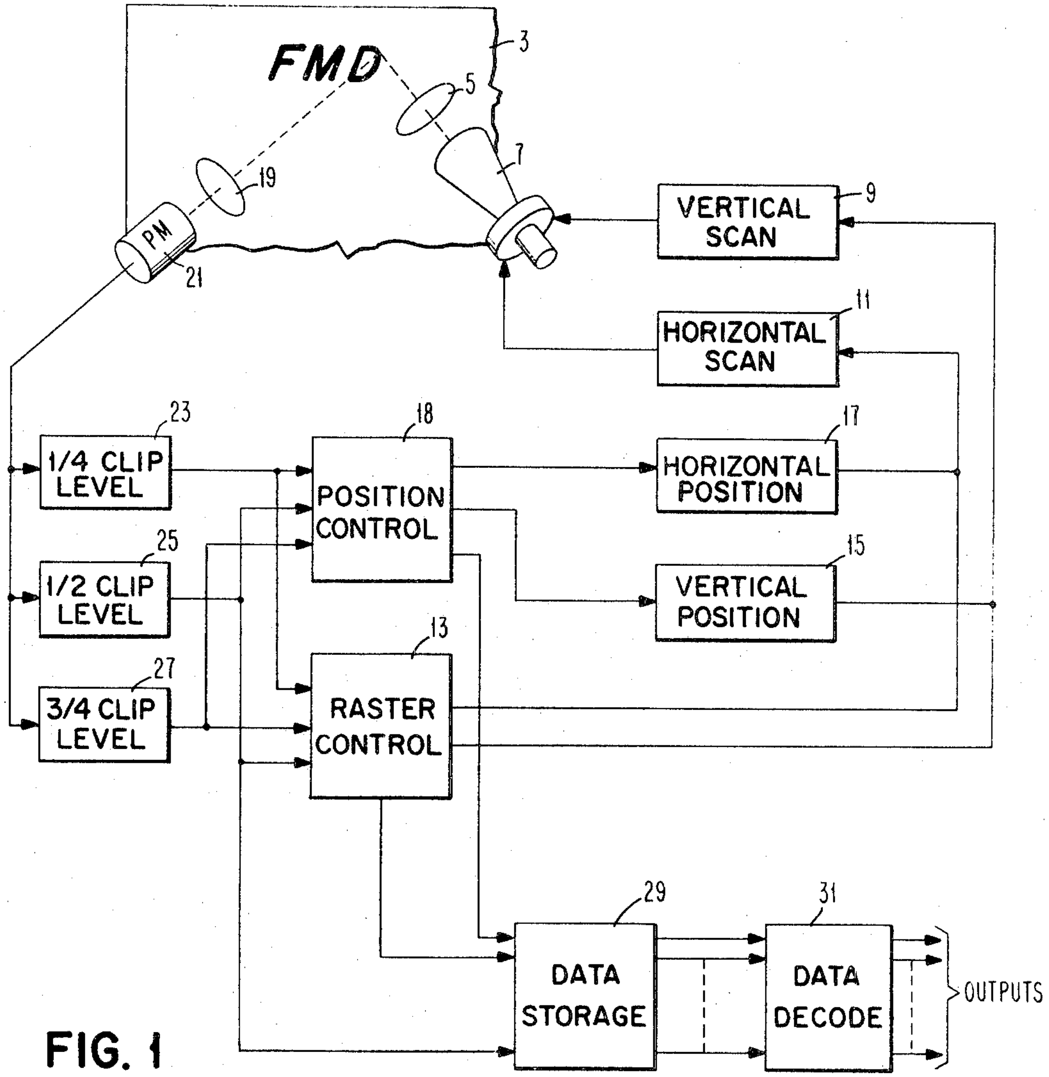
FIG. 1 is a simplified schematic diagram illustrating the principal portions of a character recognition system arranged in accordance with the present invention.

Referring to FIG. 1, characters on the document 3 are scanned by a flying spot scanner including an optical system symbolically illustrated by a lens 5 and a cathode-ray tube 7, the scan pattern being produced by scanning circuits 9 and 11 for the vertical and horizontal scans, respectively. The vertical scan generator 9 is governed by raster control circuits indicated at 13, as well as vertical positioning circuits 15, and the horizontal scan generator is governed jointly by horizontal positioning circuits 17 as well as the raster control 13. The positions of the various scans which will be utilized in the system are governed by position control circuits 18 in a manner to be described in detail subsequently. The light reflected from the document and the characters thereon as a result of the scanning by the flying spot scanner is supplied through a suitable optical system, indicated symbolically by a lens 19, to a suitable photodetector such as the photomultiplier tube 21. The output of the photomultiplier tube 21 is supplied to a plurality of circuits which determine the level of the resultant signal, designated by reference characters 23, 25 and 27. These level detection circuits are indicated in drawings as ¼ clip level, ½ clip level and ¾ clip level, and the outputs therefrom are utilized in governing the position control and raster control circuits. Also, the output of the ½ level detector 25 is supplied as an input to the data storage circuitry 29, which also receives inputs from the position and raster control circuits 18 and 13. The output of the data storage is supplied to data decoding circuits 31, from whence the outputs are supplied to any suitable utilization device, not shown, such as the input to a data processing unit, a communication system, and so forth.

The system has two operating modes, the first of which may be called the search-detect mode, which is used to find the next character to be recognized along the line of characters and to properly locate the raster with respect to the left side of the character. The second mode may be designated the register-scan mode, which locates the top of the character with respect to the raster and then continues operation for the collection of recognition data. The collection function is designed for operation with a minimum number and length of scans. Each operational mode employs a different scanning raster and the recognition of each character requires a period of operation in each of the two modes.

During the search-detect mode, a raster comprising a plurality of vertical scans is utilized for searching for and locating a character. Preferably the diameter of the scanning spot is selected so that successive scans are displaced by a distance such that the adjacent scans are side by side so that during the searching for a character, the document area is completely covered. The raster sweep is generated by a 13-step staircase voltage which is integrated to produce a ramp function current which is utilized in the vertical deflection coils of the scanner in a manner subsequently to be described in detail. The staircase wave shape is produced by the advance of a four-stage binary counter with each unit advance resulting in a voltage step. The occurrence of a video signal during the course of the search scan can be related to the scan by noting the value of the counter at the time of occurrence of the video signal.

The vertical scans may be taken at fractional horizontal pitches during the operation of locating the registration portion of the character. When searching for the left most character in a line of data, the scanned centerlines of the successive scans are displaced by P/2 where P is the pitch so that the document area is completely covered. The occurrence of a video signal during this time indicates the presence of a character and starts the beginning of a procedure for adjusting the scanned centerlines to a proper position for the register-scan mode of operation.

This lateral adjustment takes one of two values: P/2 or P/4. Which of these is made is determined by the use of two "- clipping levels" operative against the video signal. The two clipping levels are designated as ¼ clip level and ¾ clip level. The ¼ clip level is effective in controlling the adjustment if an interference between the beam and some segment of the left side of the character reduces the light reflectance by ¼ to ¾ of its normal value. IF the reflected light is reduced by a value exceeding ¾, the ¾ clip level becomes effective and supersedes the ¼ level in controlling the lateral adjustment.

The register-scan raster follows the adjustment determination described above. The first section of a registration scan consists of a series of spots, rather than a continuous scan, and the successive spots are displaced vertically by a voltage staircase which produces a displacement which is half of that produced by the staircase used in the search-detect scan. The lower section of the scan consists of discrete spots each vertically displaced by the same distance as that used in the search scan. This displacement or vertical pitch, which is used in all the scans, is related to the nominal height of the characters in the fonts to be recognized. The vertical pitch may be, for example, 0.01175 inch or one-eighth of a nominal character height of 0.094 inch.

The registration operation consists of stepping the beam downward by half vertical pitch steps until such time as an interception producing obscuration of at least half the spot area occurs, and then one additional half-pitch shift downward is taken. This final shift is invariably taken, and the resultant beam position is then located to within a predetermined tolerance of the theoretical location.

For 37 characters, the top of the character is defined by the left upper extremity. There are 10 characters which require a scan down the character centerline for proper registration. There are 5 which must be registered by the right upper extremity and four remaining (the dash, the equal sign, comma and period) which are beyond the downward reach of registration. Registration is not required for these four and they are treated as exceptions.

The achievement of a maximum recognition rate requires that the proper location at which to take the registration scan be predetermined during the detection scan. This means will be explained subsequently.

The vertical distance into which the vertical scan must be fitted is the distance between the bottom of the line of characters above and the top of the line below. The dimension chosen for the center-to-center distance of the sweep spot when in extreme positions will be increased if the radii of the half power circles are added. If this scan is centered about the horizontal centerline of the line of characters under scan, it will extend above and below the characters under scan, and near the boundaries of the character lines above and below.

The scan dimensions cannot be precise and are subject to both variation and adjustment. The values specified can only be nominal, but they should be chosen to permit a predetermined differential skew between sequential print lines and a predetermined vertical variation of character position along any line.

The maintenance of these tolerances, however, requires that the vertical scan position be monitored and progressively corrected for any line skew which may exist. The basis for this correction is the average value of the registration staircase wave at which the character tops are encountered.

Scan centering, as adjusted for line skew, requires that the top of the characters be encountered during the registration operation at, or near, the fourth staircase step. Line skew produces a slowly accumulating error in the centering of the scan, and individual character vertical locations are permitted a predetermined uncertainty of 0.012 inches, for example. These two factors in combination indicate that an adjustment of the starting point for the scan need be made only at intervals, and that the reference by which it is made can be an average of the character top locations taken over several characters.

In the present invention, an adjustment of plus or minus three vertical scan pitches has been provided. This is an upward or downward adjustment of 0.035 inches, for example, from the nominal location of the scan starting point. The adjustment range is covered by three positive (upward) and three negative steps of a single vertical pitch each.

The nature of the input data must be considered in the selection of a reference for making the line skew adjustment. The commercial use of the equipment indicates that punctuated numeric amounts will frequently occur. These use of invalid references produced by punctuation marks is avoided in the preferred embodiment as described below.

The adjustment reference will be established and a vertical correction made each time three successive characters have been registered at staircase values less than 8. The reference will be implemented by accumulating the integrals of the staircase steps (until the ½ clipping level is exceeded) on three successive character registrations. The occurrence of a registration at a value greater than 8 will clear the integrator and delay the adjustment.

The voltage value stored by the integrator capacitor at the end of three high level registrations will indicate whether or not an adjustment in the scan starting pint should be made and in which direction. A value of 6 units (equivalent to an average registration level of 2 units) will result in a positive adjustment of one vertical pitch; a value of 18 units produces a negative adjustment. Details of the arrangement will be described subsequently.

The maintenance of a centered scan, as described above, makes it possible to predetermine the proper location for the registration scan on the basis of information gained during the search-detect scan which detected the left character edge. It may be remembered that the location of this detection with respect to the scan may be known by reference to the staircase generating counter.

The left edge of the character is high and suitable for registration if the detection signal occurs before the counter advances 5. This situation will be the normal one, since it will be true for 8 of the 10 numerics, and 20 of the 26 alphabetics.

The location of the registration scan is shifted to the character centerline, and no registration scan will be taken along the left edge if the above condition is not met. This location will register both of the possible numerics, and four of the possible alphabetics.

This procedure, as thus far described, will register all numerics, all alphabetics except for the low usage characters "*j*" and "*q*," and all specials with the exception of the nonregistrable punctuation marks, the "?", the "/" and the "chair."

A registration scan is taken along the right character side if registration fails on the centerline. The probability that this registration scan will be effective is low since the "high-on-right" characters are all of low frequency usage. The scan is, however, required as a final indication that the character is one of the registrables and triggers an exception routine if it is not successful.

The registration scan is made up of two parts. The upper section, consisting of half pitch steps, is that which accomplishes the registration operation. If registration occurs (i.e., a spot is obscured to the ½ clip requirement, and one further step taken), the counter producing the voltage staircase is advanced no further. A second counter, which generates a full pitch staircase, takes over at this point. Under this second control the spot is shifted downward eight times with each shift a full vertical pitch. The net results of this combination are nine spot positions evenly distributed vertically. The first spot position determined by the registration operation, together with the eight produced by the second control, provides for the collection of nine bits of video data along the nominal height of a character.

Two more data collection scans follow the composite scan. The second is along the character vertical centerline, and the third along the centerline of the right character segment. All three of these rasters are discontinuous in that the beam is blanked as it is shifted at high speed from one position to the next. The beam is unblanked for an equal period in each of the 27 positions of the recognition data raster, and a ½ clip level is applied to judge whether the reducing reflectance has been that from a character segment or not.

This collection of recognition data is thus the sampling of 27 specific and identical locations in each character area—the area having been defined by a probe of the left edge and top of the character.

A unit horizontal displacement (horizontal pitch) designed as P is defined as equal to nominal character line width. Searching scans for the leftmost character of a line are spaced at ½ horizontal pitch. An adjustment of the horizontal scan location of ¼ pitch may be required by the ¾ clip level detection of a character. Recognition data scans are normally displaced by twice horizontal pitch. This same displacement is required for the first search scan to follow the third recognition data scan when search is started for the second and following characters. An exception routine for the recognition data scan, not yet described, requires still another variation—a displacement of a single pitch.

In summary, horizontal displacements for all requirements are: 2, 1, ½ and ¼ increments of horizontal pitch. The control to be used is a digital counter whose advance by a unit produces a displacement of one horizontal pitch, cooperative with two latch-operated "modifiers" capable of ½ and ¼ pitch, respectively.

There are two groups of characters whose widths are other than nominal. The period and colon are ¼ nominal width, and the characters "4" and "J" are ¾ nominal width, for example.

There are characters whose tops lie below the range of the registration process (eight downward steps of the spot) and which may be termed "unregistrables."

The exception procedure to the normal Data Collection Raster to be described below is designed to collect recognition data for both the unregistrable and the variant width characters.

The characters comprising these two classes are as follows: comma, period, colon, semicolon, "=," "+," and "J."

Width Variants: "4," "J," comma, period, semicolon, colon, and apostrophe.

The exception routine is initiated by either of two nonnormal occurrences during the normal procedure. They are: a failure of the registration process, or a failure to collect recognition data on either the second or third scans for registration data.

The exception routine will be initiated by registration failure for all of the characters listed above with the exception of the "4" and the apostrophe. Both of these will be indicated as registrable because of a high left character top. The "J" will fail registration because the upper right section of the top is high, but since it is spaced at ¾ nominal width, it will be missed by the registration attempt along the right character side.

The exception routine will start for the "4" at the end of the third recognition data scan on which no data will be collected. It will start at the end of the second recognition data scan for the apostrophe since the ¼ width of this character will prevent the collection of the data from a scan displaced by 2P.

The collection of data whereby the characters listed above may all be recognized can be collected by four scans rather than the normal three. The locations of these four are: (1) along the path of the leftmost normal recognition scan; (2) displaced by a full pitch from first; (3) displaced by 3P from the first (and on the path of the second normal recognition scan); (4) displaced 3P from the first.

The period, the colon and the apostrophe produce no data after the first two scans of the exception routine; the comma and semicolon, none after the first three. Scan (4) is necessitated by the characters "4" and "J." Those scans taken beyond those actually required represent a penalty of choice so that further complexity is scan routines may be avoided.

The type of recognition scan employed during exceptions routines depends upon whether or not the character has been registered. The scan for those characters which register is that described as normal; i.e., the nine-spot observation per location.

The scan type used for the nonregistered characters is the search-detect type. It should be remembered that the position of video signals may be registered with respect to the scan-producing staircase voltage during this type of scan.

The requirement for the recognition of a large variety of characters leads to the necessity of the storage of a large amount of data, since uncertainty or variation in the location of segments critical for recognition demands a high resolution scan.

The use of mechanical scanners further increases the storage requirement since the character area cannot be located with a scanner of this type and consequently an over-large area must be scanned so as to be certain that the scan has covered the character. All data within this area must be stored since there is not certainty as to where, within the storage, the significant data is to be found.

Both of these factors are absent from the prevent invention; consequently the recognition data storage capacity can be small. The nominal character dimensions of character width—$5W$($W$= line width)—and the centering of horizontal character elements at integral numbers of eights of nominal character height permits the use of a 5×9 matrix.

A study of the data theoretically derivable from all characters on this basis, however, indicates that a considerable redundancy exists. This redundancy is of no assistance in the recognition of the characters if the quality of the data is such as to make the collection of data reliable from any section of a character.

The data used for recognition is reduced from that derivable from a 5×9 matrix to the point where all redundancy has been eliminated. This reduction may be pictured as a "compression" of the character in both the vertical and horizontal directions. This compression is to the degree that the 5×9 matrix is reduced to a 3×5 matrix.

The reduction in width is accomplished by the use of only three recognition data scans for the normal case. The reduction in the vertical dimension from 9 to 5 is accomplished by allocating the nine spots in each scan to "zones" of which there are five. The storage for recognition data consists of 15 elements which may be triggers or latches. For the purposes of this description, it is convenient to think of them in a 3×5 matrix formation.

The combination of character location determination, as made possible by the use of a CRT scanner, and data compression which is possible by restricting the variety of characters to be recognized, has a significant effect upon the cost and complexity of the data storage and recognition circuitry. The reliable operation of this circuitry is dependent upon the maintenance of a reasonable level of print quality.

The nine pints on each of the three vertical recognition scans may be considered as pints on imaginary horizontal lines crossing the characters, so that the first point on each of the three scans defines a topmost line through the character, the second point on each scan defines the next lower line through the character, and so on. A video signal collected in a character area at any one of the six locations in the two upper rows is assigned to zone 1. Similarly, data collected in either rows two or three is assigned to zone 2. On this overlapped basis with respect to the second row, a signal derived from this row is assigned to both zones 1 and 2.

Signals derived from the nine locations in rows 4, 5 and 6, counting from the top of the character, are given a zone 3 value, signals from rows 7 and 8 have a zone 4 value; and those from 8 and 9 are allocated to zone 5. Signals from row 8, like those of row 2, are given a dual zone value—zones 4 and 5.

The matrix of storage elements is addressed by the conventional coordinate method. The five zones are the five horizontal address lines, and each of the three normal recognition data scans is a vertical address line.

The compressed character formations are readily recognizable by the human eye if the contents of storage is visually displayed in matrix from a service aid.

The exception procedure for the collection of recognition data from unregistrable and width variant characters must have a counterpart in the addressing of storage for the data so collected. It may be remembered that two different types of scan were used for this group of characters. Those which were registerable, the "4" and the apostrophe, were scanned in the normal 5×9 matrix fashion; the unregistrables were scanned by the continuous type of scan used in the search-detect mode.

These scans are taken in horizontal positions (with respect to the character width) 1, 2, 3 and 4, rather than 1, 3 and 5 when in the normal procedure. The data collected on the four scans taken in the exception procedure is stored by compressing the data from scans 2 and 3 into column 2 and 3 of the storage matrix. The data from the first scan is addressed to the first matrix column, and that from scan 4 in the third matrix row.

For the registrable characters the horizontal addressing of the matrix is in accordance with the zones as in the normal procedure. The zoning operation will not be functioning for the unregistrable characters, but data in successive sections of the search-detect scan will be manifest by a change in value of the staircase wave in the course of the video signal.

The data derived on the search-detect scans is stored in successive rows of the storage matrix on basis of arrival times. The storage of data on this basis produces a peculiar distortion similar to character "squashing." The distortion is a function of the real shape of the character and is therefore different in each instance. The "J," for example, is apparently inverted, while the "-" is shifted to the upper row of storage.

The recognition circuitry must operate within the period required by two search-detect scans if the recognition rate is to be maintained equal to the rate at which the characters may be scanned.

The decoding circuits chosen to meet this requirement, an to maintain an easily understood and easily serviced system, are simple AND circuits operative directly from the storage elements themselves, and with no intermediate storage of "-forms" or "shapes" as employed in other character recognition devices.

The output of the recognition section can be readily translated into any desired code for direct transmission to a utilization device such as a data processor, or a printer, or to a buffer memory if further storage of the data is required.

Each of the output AND circuits is used to turn on a latch. A power stage is associated with each of these units, which is capable of driving any required combination of the output code. Each of the power stages is diode connected to each of the lines which must be powered to represent the character associated with the power stage. The lines thus powered are used at the receiving end to set the register from which data is taken for storage in the associated device.

Figure 3:
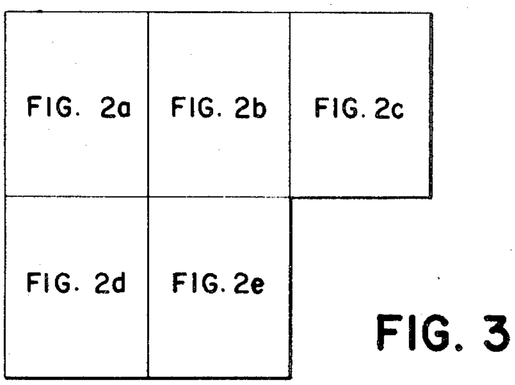
FIG. 3 shows the manner in which the drawings of FIGS. 2*a* through 2*e* should be arranged.

A more detailed illustration of a preferred embodiment of the invention, arranged to carry out the functions described above, is shown in FIGS. 2*a* through 2*e*, which should be arranged in the manner shown in FIG. 3.

Referring to the various ones of these drawings, the reference characters 101 and 103 designate a pair of photomultiplier tubes which are connected to provide parallel input signals as a result of the changes in reflectivity caused by the scanning of characters in the usual manner. As is conventional in equipment of this type, two pairs of tubes are provided in order to compensate for their displacement from the ideal position with respect to the scanning of the character. The output of the photomultiplier tubes is supplied as an input to amplifiers and clipping level circuits 105, 107, and 109, designed as ¼ level, ½ level and ¾ level, respectively. A suitable setting means for these three amplifiers is indicated symbolically by the tapped potentiometer, which is operated by a control 111 for setting the operative levels of these amplifiers.

Figure 2A:
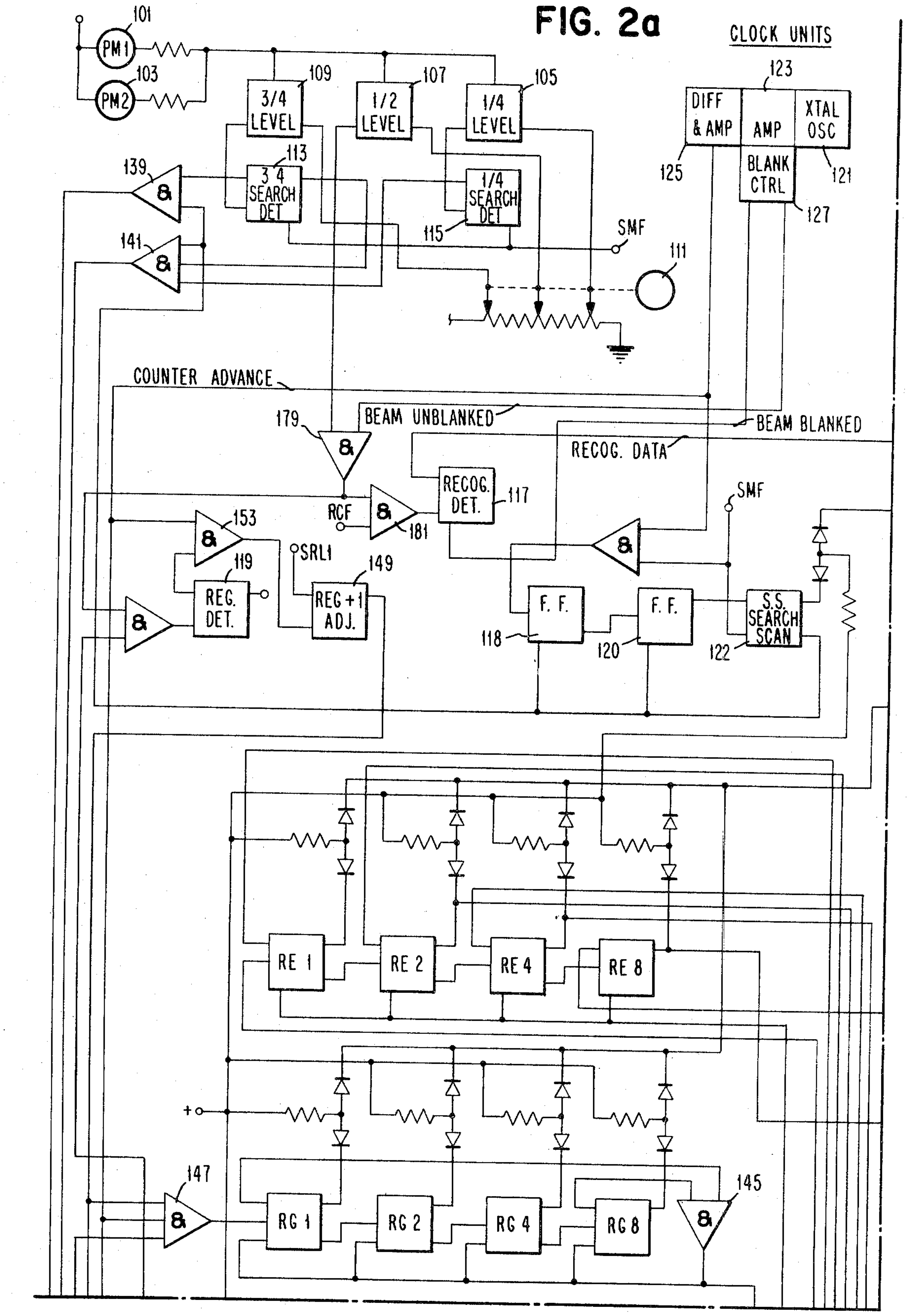
FIGS. 2*a* through 2*e*, when arranged as shown in FIG. 3, are demonstrative of the details of the invention shown in FIG. 1.

Storage units for the retention of an encounter of the beam and a character segment during the different mode of operation are located in the upper portion of FIG. 2*a*. These units may comprise electronic latch circuits of conventional construction, designed by e reference characters 113 and 115, and further indicated as a ¼ search detect and a ¾ search detect. These two units are operative for the search mode of operation. The recognition detect latch and registration detect latches, designated by reference characters 117 and 119, are also found in FIG. 2*a*.

Figure 2B:
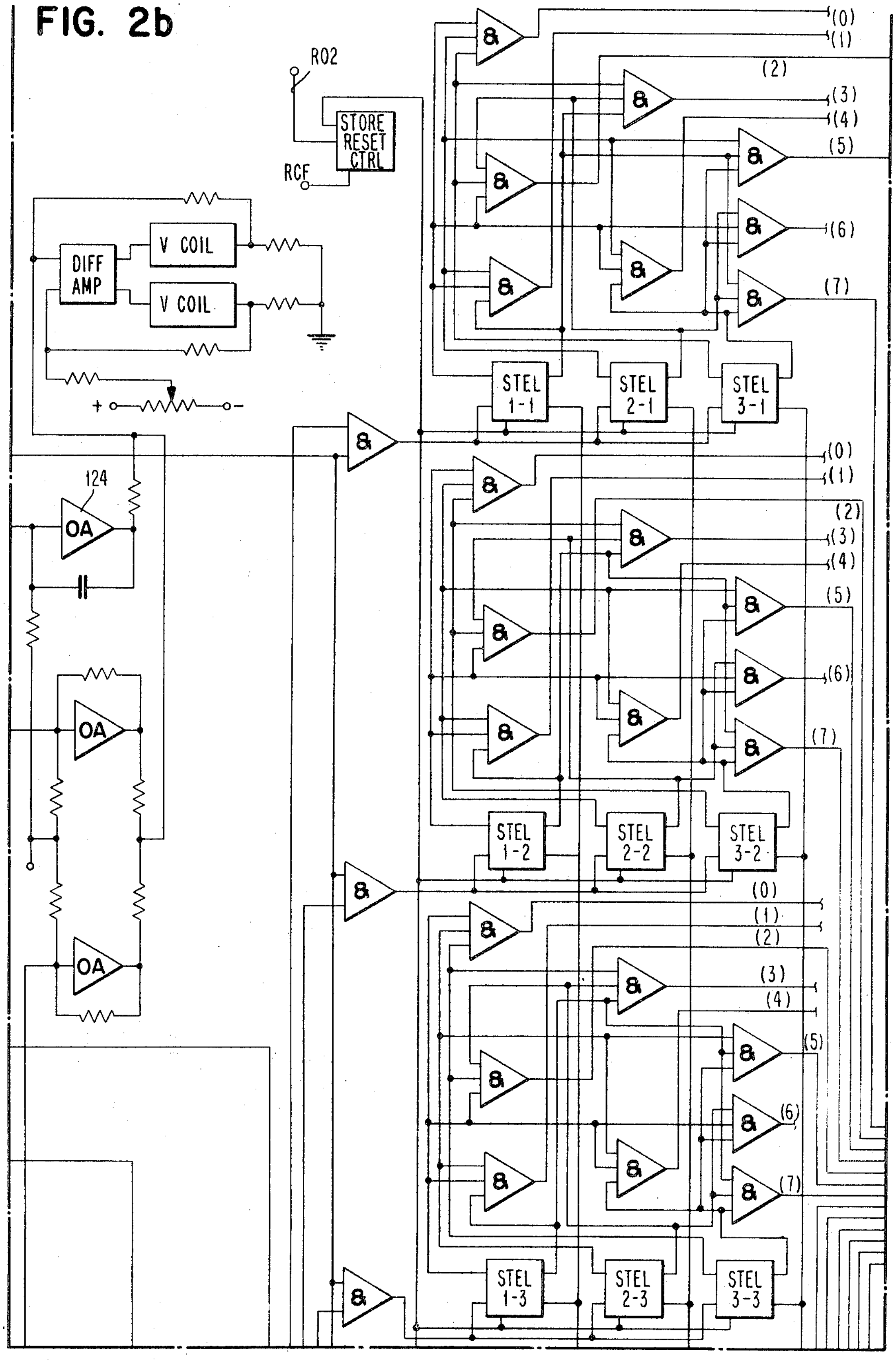

The search scan mode is governed by units shown near the center of FIG. 2*a* and center left of FIG. 2*b*. These include a two-stage binary counter with stages 118 and 120, a multivibrator 122 designated as "S. S. Search Scan," and an operational amplifier 124 connected to operate in integrating mode.

Figure 2C:
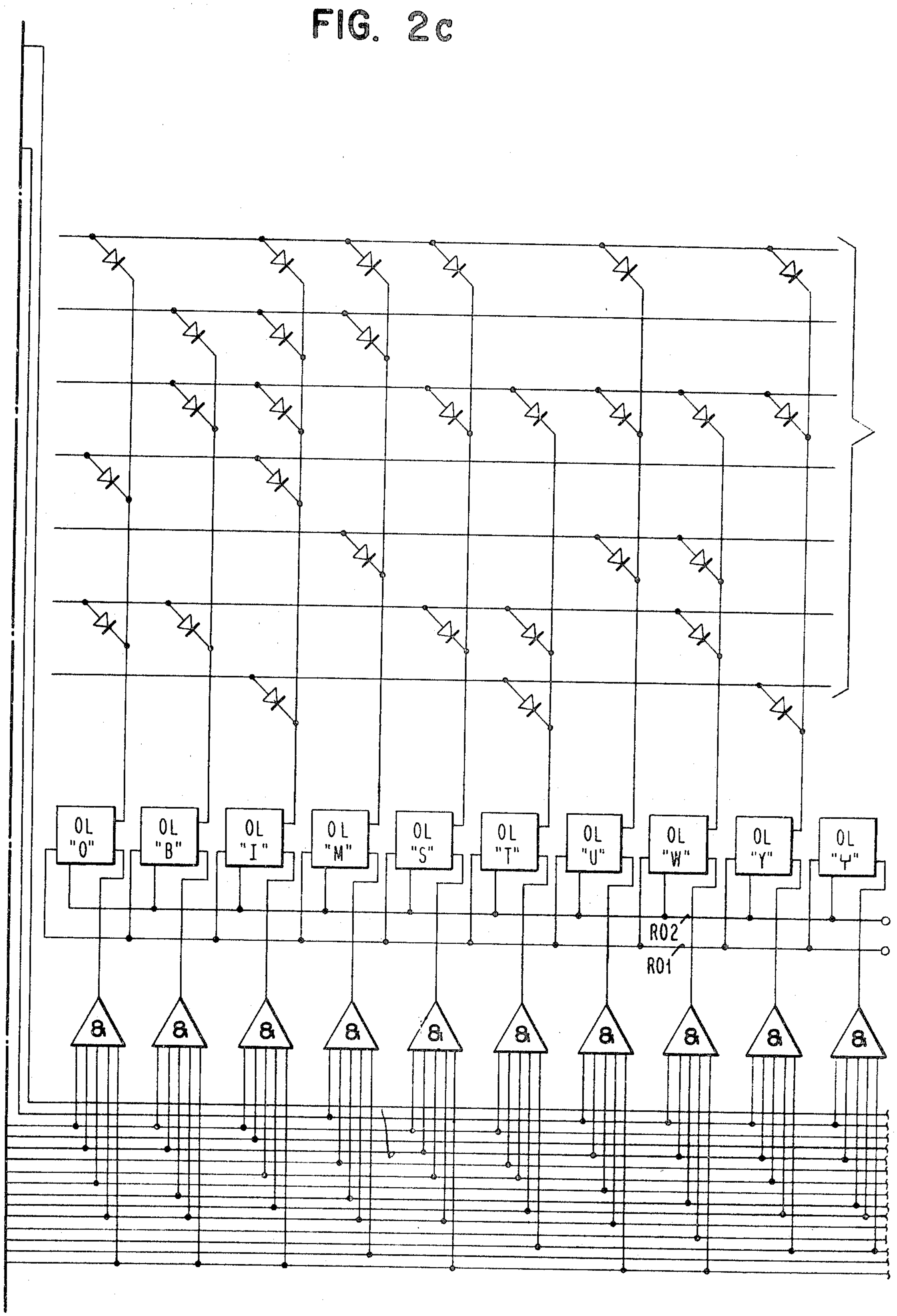
Figure 2D:
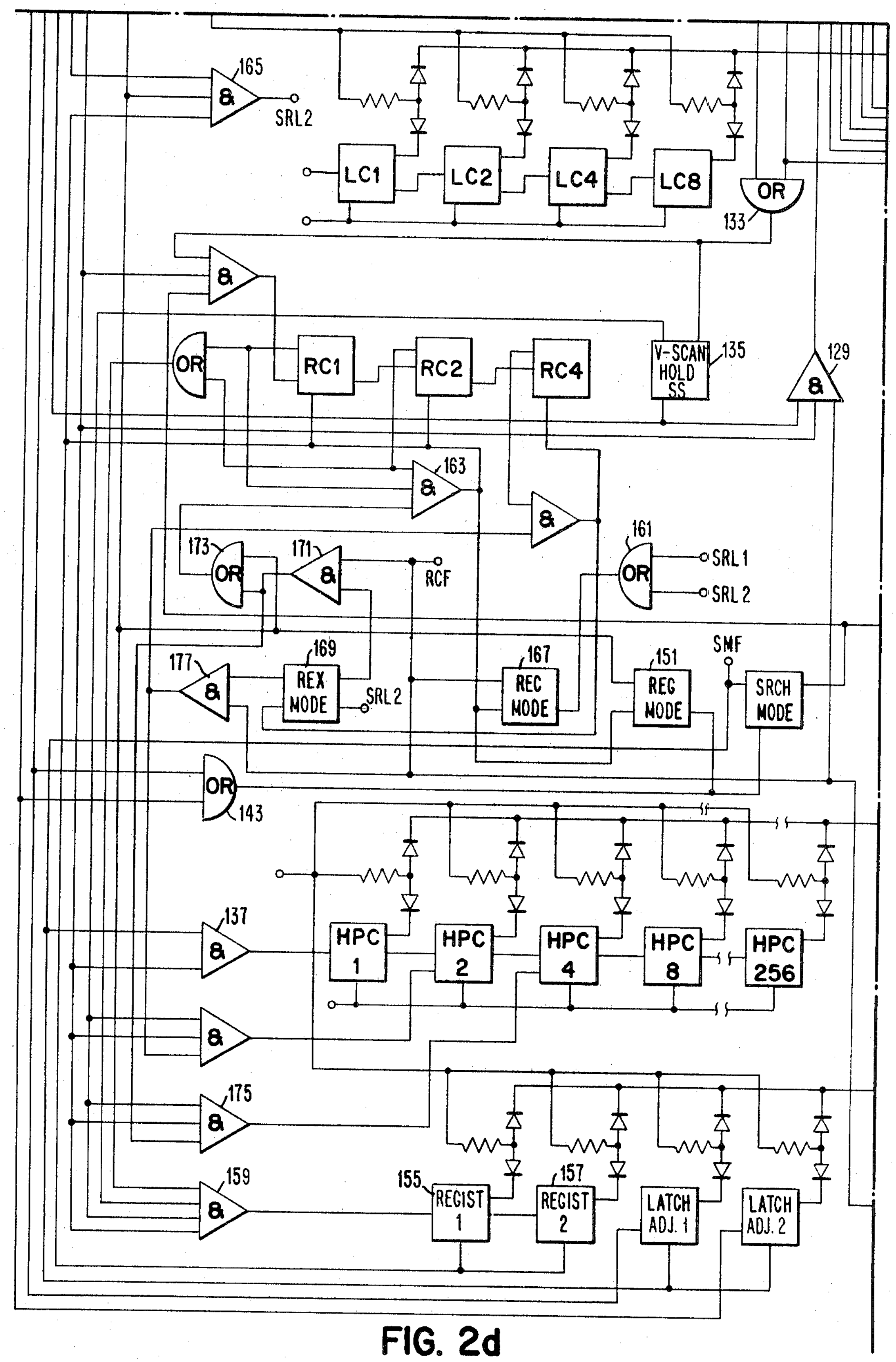

The circuitry shown in the lower half of FIG. 2*a* and in FIG. 2*d* of the drawings is that used for the control of the cathode-ray tube scanner beam and for the generation of the various rasters which are employed during the operation of the system. There are eight flip-flop or trigger units shown in the lower portion of FIG. 2*a*. The topmost four, designated as RE1, RE2, RE4 and RE8, are wired to form a binary counter and may be designated as the "recognition" units. This counter has control of the vertical position of the scanning beam during the recognition mode of operation. The lowermost four flip-flop units are designated as RG1, RG2, RG4 and RG8, and their function is to control the vertical position of the scanning beam during the registration operation and may be designated as the registration counter units.

At the top of FIG. 2*d* there are four flip-flop units associated as a binary counter and designated as LC1, LC2, LC4 and LC8. This counter provides the various vertical positions of the scanning beam required for operation in various lines of print on the input document. Below the line counter units a three-stage binary counter is provided which may be designated as he raster control counter and comprises the stages RC1, RC2 and RC4. The raster control counter controls the three-column raster previously described which is used for the recognition and registration operations and the four-column raster used for the recognition exception operation.

Near the counter center of FIG. 2*d* there are four latches which govern the operation of the system in its various modes. These mode locations are designated as REX mode, REC mode, REG mode and SRCH mode designating, respectively, the recognition exception mode, the recognition mode, the registration mode and the search mode. These may be considered the major controls which operate in the sequence search-registration-recognition to provide the proper performance pattern of the cathode-ray tube scanner beam. The recognition exception latch is selectively operated in conjunction with the recognition latch.

The horizontal position of the scanner beam is also under the control of eight flip-flop units which form a binary counter, only five of which are shown, and which are designated as HPC1, HPC2, HPC4, HPC8 and HPC256. These are arranged in binary counter fashion as shown in the lower portion of FIG. 2*d*.

Lowermost in FIG. 2*d* there are two flip-flop units designated as REGIST 1 and REGIST 2 connected to form a binary counter and used to set the positions of the beam at which the second 1 third registration scans are made. Also, the bottom of FIG. 2*d* are two flip-flops, designated as LATCH ADJ. 1. and LATCH ADJ. 2, which provide the final adjustment in the horizontal position of the beam following the initial character segment interception during the search operation.

The deflection circuitry which provides the vertical positioning and the deflection of the CRT beam is shown in detail at the left-hand portion of FIG. 2*b* as arranged for electromagnetic deflection. A two-section vertical deflection coil is driven by the outputs of a differential amplifier the input of which is fed by the outputs of two operational amplifiers whose outputs are added in a suitable resistor network, in addition to the separate operational amplifier 124 arranged with a feedback capacitor to act as an integrator for purposes to be subsequently described. The principal operational amplifiers are controlled by currents which are caused to flow in multivalued resistors associated with each of the flip-flop circuit stages which make up the three binary counters, which in additive fashion result in setting the position of the beam in the vertical direction.

Figure 2E:
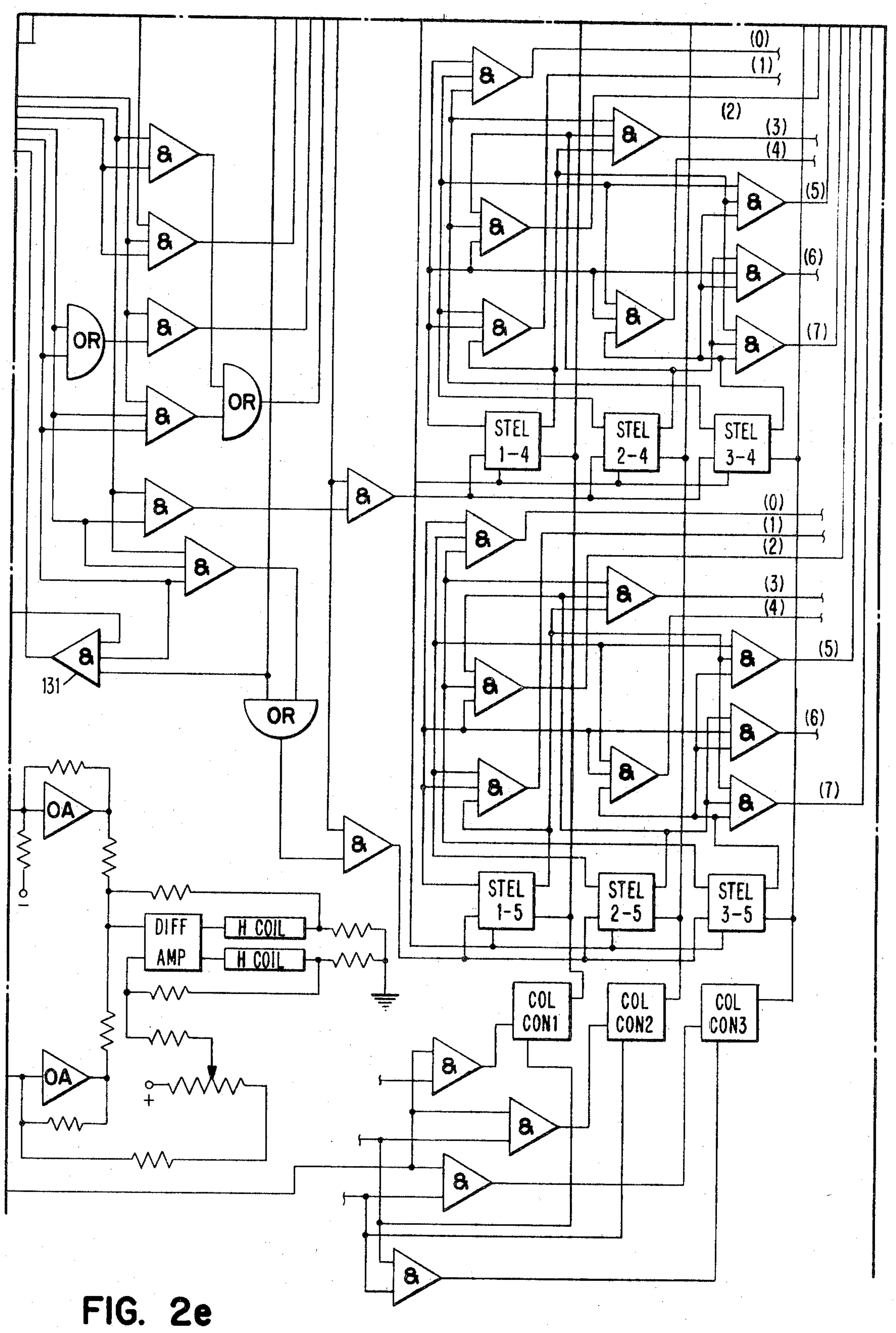

Similar circuitry shown in at the bottom left portion of FIG. 2e is utilized for controlling the horizontal deflection of the cathode-ray tube beam.

Those aspects of the scanner controls which are basic to the recognition operation are shown and described in detail. The description necessarily defines a specific value for several scanner parameters which are to be taken as illustrative only. For example, the horizontal position control counter, as shown, is limited to a total deflection of approximately 3.6 inches. Similarly, the line counter units shown restrict the scan operation to 16 lines of type.

The capacities of these counters, and a precise control for them, are not delineated since they depend primarily on the characteristics of the input data. Control of the scan line length, for example, and the programming of line sections to be selectively skipped, are conventionally controlled by the recognition of video data from preprinted lined on the input data form. Such video signals are used in conjunction with an external program for the advance of the horizontal scan controls of and their reset. Similarly, the rest of the horizontal scan controls is conventionally used to advance the line controls. These signals are also subject to external programming for the purpose of line selection recognition.

In the left-hand portion of FIGS. 2b and 2e there are shown a plurality of AND and OR circuits which combine the outputs from the various counter circuits with information indicating that a character segment has been detected to thereby provide output signals on one or more of five zone address lines.

The five zone address lines are supplied to each of three storage elements in each of the five rows of elements shown in the right-hand portion of FIGS. 2b and 2e. The storage elements are arranged, therefore, in a 3×5 matrix pattern as was described above in connection with the general description of the invention.

In FIG. 2e, at the bottom of each column of storage elements, there is shown a column control unit designated by the title COL CON 1, COL CON 2, and COL CON 3 for the first, second and third columns, respectively, of the storage elements. These units, when rendered active, gate all of the five units in the associated column and thus they constitute the vertical addressing coordinates of the storage. To the left of each row of storage elements there is a particular AND circuit in which the video signal supplied from the recognition detection circuits and the five zone address lines are combined. The outputs are shown connected to the set terminal on each of the three units of the respective rows.

Between the five rows of storage elements there are shown a plurality of AND circuits which are employed to combine the outputs of the row storage positions to thereby decode the binary value. The AND logic circuits for combining the outputs of the first row of storage elements are shown above that row. These outputs appear on one of eight output lines associated with each set of the logic circuitry associated with the storage elements.

The final decoding for the identification of a specific character is shown in a fragmentary form in FIG. 2c. In this figure, the 7, 5 and 2 valued lines from each of the rows have been drawn therefrom and the five-input AND circuits for some of the characters whose characteristics require these values are shown. The five-input AND circuits are provided for each character which is to be recognized and, accordingly, it is believed that the exemplary ones sown will indicate the manner in which the rest could be connected. The combined signal from these AND circuits may then be supplied to the input of an associated output latch, such as the row of latches designated by the reference characters OL, followed by the character in quotation marks which they represent. The output lines from these latches may be supplied to any type of decoding circuit such as the diode matrix shown for appropriate encoding for some further utilization device.

Considering the circuitry shown in FIGS. 2a through 2e in further detail, the operation of the equipment will be described below generally in the order in which the major circuit components were described above. However, the circuitry which controls the cathode-ray tube scanning beam will be described in terms of its operation in the various modes in which it operates.

Two photomultipliers are connected in conventional fashion as previously pointed out. Two photomultipliers are sown, but this number may be varied in accordance with the construction of the scanner portion of the machine. When the cathode-ray tube is blanked by the application of the blanking signal to an appropriate electrode in the tube, as is well known in the art, the output of the photomultipliers will be a noise voltage at or near ground level. The unblanked beam reflected from a portion of a document other than a character segment will produce a negative voltage at the output, the value of which will be a function of the reflectivity of the paper, the beam power and size of the spot. The signals derived from an encounter of the beam with the character segment will be something less than this value. In the search mode of operation they will be upward excursions from the "white" level toward ground, but the greatest excursion will always remain negative with respect to ground. If the beam is blanked and then unblanked in the position at which it met a character segment, it would take a downward excursion from ground to some negative value which is less negative then the "white" level. The ¼, ½ and ¾ level amplifiers 105, 107 and 109 shown in the diagram are symbolically illustrated. In actual design, they may be a single assembly of multiple stages tapped at various stages for the various clipping levels and provided with suitable feedback for gain stability. Also, it may be noted that the detection adjustment, which is here shown as governed by a manual control 111, may very well use some type of automatic gain control arrangement as is well known in optical character recognition systems.

The search mode raster consists of an indeterminate number of vertical scans which are displaced from one another by a single character pitch. The beam is blanked only during flyback, and a vertical excursion is a predetermined distance downward from a position determined by the line counter units.

The counters and other timing operations are governed by means of outputs from several units designated as clock units and including a conventional crystal oscillator 121 which supplies energy through a shaper amplifier 123 to a differentiator and amplifier 125 which supplies therefrom pulses on a line designated by the legend and ADVANCE. Also, the output from the unit 123 is supplied through a blanking control signal generator 127 which provides outputs on the lines designated by the legends BEAM BLANKED and BEAM UNBLANKED.

As previously noted, the two-stage counter and search scan SS 118, 120 and 122 cooperate to control the search scanning operation. The output of the multivibrator is an unbalanced wave, the position portion of which is integrated by the operational amplifier to produce a ramp voltage which results in a downward deflection of the beam. The negative section of the wave discharges the integrating capacitor and results in beam "flyback."

The binary counter is used to synchronize the multivibrator action with the clock pulses. The two stages 118 and 120 act as a divider (4) which, together with the time constants of the multivibrator, synchronize the multivibrator action with every twelfth pulse of the clock. Operation to permit both the counter and the multivibrator require that the search mode latch be ON so that a signal is present at terminal SMF. The negative (flyback) pulse duration is a function of the multivibrator time constants and is sufficient to permit the operation of the beam lateral position controls prior to a second vertical scan.

The single short "V-Scan-Hold SS" 135 has the function of delaying the repetitive operation of the controls whereby the vertical position of the beam is altered. This delay is for the purpose of permitting the CRT beam to be shifted to a new horizontal position before the next vertical scan is taken and is employed during the registration and the recognition modes of operation.

This unit 135 is set ON by a pulse supplied thereto and after a suitable time period, the unit is self-restored to its OFF state.

The input pulse to unit 135 are supplied from the output of OR circuit 133. The inputs to this circuit are in turn derived as a result of the registration and recognition counters reaching predetermined values, at which time the counters reset themselves and the same resetting pulses are supplied to OR circuit 133.

The required lateral displacement for the next search scan is produced by advancing the eight-stage horizontal position counter in FIG. *2d* by one unit. There are three separate inputs to this counter, each of which is controlled by a three-input AND circuit. In the search mode, the uppermost AND circuit 137 is effective to supply inputs to the counter, the controlling condition being that the search mode latch is ON. The second input to the AND circuit is, of course, the counter advance pulse input which causes the counter to step.

The resetting of the multivibrator permits the operation described above to the repeated.

The search mode scanning operation described above will continue until such time as a scan is taken during which a character segment is encountered. Such an encounter or more than one encounter will set one or both of the search detect storage elements 113 or 115 sometime in the course of the scan. These units 113 and 115 in FIG. *2a* have their outputs wired into two AND circuits 139 and 141 whose functions are to give precedence to the ¾ unit or the ¼ unit and to time the adjustment to the horizontal position with the completion of the vertical scan. This timing is accomplished by the use of the search-recognition counter reset pulse as an input to both of the AND circuits. One of the AND circuits will be operative to set an adjusting latch at the bottom of FIG. *2d* which provides the final requirement of the search mode. The outputs of AND circuits 139 and 141 are also supplied to an OR circuit 143, located in FIG. *2d*, which resets the search mode latch and continues the recognition operation by also setting the registration mode latch.

As previously pointed out, the location of the upper boundary of the character is determined by the registration mode, and the scan used in this operation is discontinuous in that the spot motion consists of a plurality of discrete jumps rather than a continuous scan. The beam is blanked during those times when the beam is in motion between the discrete spot positions. The vertical motion of the spot is half that of the normal vertical pitch, for example 0.0058 inches.

The registration counter in the lower portion of FIG. *2a* consisting of four stages is capable of producing 16 spot positions. However, it is not used in this instance beyond the eighth step. The AND circuit 145 provides an output which resets the counter when a count of 9 is reached. The output of this AND circuit provides one of the inputs to the OR circuit 133 which sets the V-scan-hold single-shot. As previously pointed out, the V-scan-hold will delay the further operation until the horizontal position of a following scan has been set. The registration counter is advanced by the output of three-input AND circuit 147 which requires that the V-scan-hold be off, the registration-plus-one latch 149 be off, and the occurrence of a counter advance or clock pulse.

The number of scans required for character registration is indeterminate since it depends upon the character shape. The minimum and usual case will be one scan and the maximum will be three. The horizontal position for the first registration scan has been determined by the adjustment operation described above as the last step of the search mode operation. The first registration scan may therefore be started by the first counter advance or clock pulse following the setting of the registration mode latch 151.

If, during the first eight steps of this scan, a character segment is encountered by the spot, the registration detect latch 119 will be set by the output of the ½ level amplifier 107. The ON condition of latch 119 will condition a two-input AND circuit 153 so that the next counter advance pulse will not only advance the registration counter but will also set the registration-plus-one latch 149. The on condition of latch 149 will block any further counter advance pulses from reaching the registration counter. The value standing in the registration counter will thus be one greater than the at which the character segment was encountered. The corresponding vertical position of the spot will therefore be within a plus or minus tolerance of a predetermined value from the centerline of the topmost character segment as required by the performance criteria of this embodiment. This spot position will be maintained thereafter as a baseline for the recognition scans by maintaining the counter value.

If registration is not accomplished on the first registration scan, a second must be taken which is laterally displaced by a suitable amount from the first scan. REgistration failure on the second scan requires a third registration scan displayed by an equal distance from the second as the second is from the first. The units by which these displacements are made are designated as the REGIST 1 and REGIST 2 units, 155 and 157, shown at the bottom of FIG. *2d*. These units are effective as a binary counter which, when set on, draw current trough appropriately valued resistors so as to produce the required deflection of the spot by suitably altering the current through the horizontal deflection circuitry. The counter comprising units 155 an 157 is advanced as a result of the output of a four-input AND circuit 159 which requires the following input conditions: the ON condition of the registration mode latch, the ON condition of the V-scan-hold latch, and the ON condition of either stage one or two of the scan control counter. The advance is timed by the counter advance pulses which constitute the fourth input to the AND circuit 159. The circuitry described will permit the advance of two stage counter by more than one step unless the V-scan-hold single-shot resets prior to the second counter advance pulse.

If registration is accomplished during either the second or third scan, the further advance of the registration counter will be blocked. The registration operation is then terminated by the activation of the REG +1 ADJ latch 149 whose output is supplied to the terminal SRL 1. The corresponding terminal is one input of an OR circuit 161, the output of which governs the resetting of the recognition mode latch. In the event that the character is not registrable, the registration is terminated by the scan control counter.

The scan control counter is advanced by the reset of either output of the registration counter in any operating mode other than search. It is thus advanced at the end of each registration scan and will shift to the value 3 at the end of the third registration scan. The AND circuit 163 located just below the second stage RC 2 of the counter in FIG. *2d* causes the reset of the counter just after this advance and serves two other functions as well. The two stage binary counter comprising units 155 and 157 is reset thus returning the horizontal position of the spot to that point originally set by the search operation. Also, an AND circuit 165 at the upper portion of FIG. *2d* will provide an output to a terminal SRL 2 to set the recognition mode latch 167 and the recognition exception mode latch 169.

The registration operation is thus concluded with the registration counter standing at the proper value required for the start of the recognition mode, and with either the recognition latch or both, the recognition and recognition exception latch in the ON condition. The horizontal position of the beam is returned to the position originally determined by the search mode and all conditions are then proper for either the recognition or the recognition exception operation.

In the recognition mode operation, the collection of data for character recognition requires that three scans of the character be taken. These scans are of the discontinuous type and are located at the left boundary of the character as determined by the search mode, at the character vertical centerline and at the right character boundary. On each of these scans, the spot is unblanked and shifted eight times in the vertical direction which, taken with the initial spot location, provides nine observations of character data per line.

The initial position of the spot at the start of each of these scans is that determined by the registration operation and is maintained by the setting stored in the registration counter. The eighth additional downward shifts result from the advance of the recognition counter.

The advance pulses for the counter are provided by the output of AND circuit 129 which permits the counter to be advanced by the counter advance pulses only if in either the recognition or search mode, and if the V-scan-hold is in the reset or OFF condition. The counter when operating in the recognition mode will be reset when it reaches a value of 9 as a result of the output of an AND circuit 131.

Three recognition scans will be taken under control of the scan control counter. This counter will reset after reaching the value of 3 as previously described for the registration mode operation. An AND circuit 171 will actuate an OR circuit 133 provided the recognition exception latch is in its OFF state and the recognition latch is in its ON state. The output of OR circuit 173 together with a value of 3 standing in the scan control counter will permit the reset of the scan control counter and the recognition mode latch. This action terminates the operation at the end of the third recognition scan. The recognition at which the three scans are taken during the recognition mode are determined by the horizontal position counter shown horizontal the lower portion of FIG. 2*d*. At this time the counter is advanced by pulses supplied from a three-input AND circuit 175 leading to stage HPC 4 of the counter. The horizontal position for the initial recognition scan is that determined by the search mode, the second scan is laterally displaced by a predetermined amount by the first advance pulse to stage HPC 4 of the counter. The third scan is displaced a total of twice the distance of the first displacement by a second counter advance pulse supplied to HPC 4. The conditions under which the counter is advanced at this time include the recognition latch ON, the recognition exception latch OFF, and the V-scan-hold single-shot ON. The advance is limited to a single pulse by energizing a modifying terminal of the single shot vertical scan hold.

In the recognition exception mode operation it is necessary that four scans be taken with a lateral displacement of one half the value of the displacement when in the recognition mode. The horizontal location of the first scan is as before, but further horizontal displacements will be those resulting from counter advance pulses supplied to the second stage of the horizontal position counter. The operation is controlled by the scan control counter which in this mode is reset after the fourth scan. An AND circuit 177 (FIG. 2*d*) is operative under the condition of both the recognition latch and the recognition exception latch in the ON position. The output of AND circuit 177 further combined with the value 4 in the scan control counter will result in resetting the 4 unit of the counter, which is the only stage in the ON condition, and the recognition exception latch.

Since this mode of operation is used for unregistered characters, the registration counter will stand in the reset condition, and all vertical scans in this mode will have the same starting point as a search mode scan. Since these scans are longer than those used for the recognition mode, the reset control on the search recognition counter must be shifted back to value 14 as used in the search mode. Counter reset circuitry is not shown in the circuit diagram since it would be conventional in nature.

It has been previously explained how the addressing means for the data storage elements functions. The video signals which originate during any time the recognition mode latch is on may be traced from the ½ level amplifier 107 via AND circuits 179 and 181 to the recognition detection latch 117. The output of this unit conditions one input to a two-input AND circuit so that the occurrence of a suitable store impulse, which is a clock-derived pulse following the counter advance pulse, will raise one input of the row address circuits at each row of the storage matrix.

Concurrently, one of the five zone lines will be up in accordance with the setting of the recognition counter units, so that a set pulse will be supplied to each of the storage positions in one row of the storage matrix. ONe of the three column control units will also be operative to gate all the storage units in one of the three rows so that the storage unit at the intersection of the gate and set lines will be set on to the ON condition.

This operation will be repeated during the next unblanked period of the recognition scans since the recognition detect unit is reset by the blanking pulse and is thus again responsive to the output of ½ level amplifier 107 when the scan is again unblanked.

The decoding of the outputs of the storage elements has previously been described and need not be repeated at this point.

From the foregoing, it will be apparent that the present invention provides a novel character recognition system especially suited for stylized characters of controlled print quality, including several novel features for the control of the scanning format of the flying spot scanner.

While the invention has been particularly shown and described with reference to a preferred embodiment thereof, it will be understood by those skilled in the art that various changes in form and details may be made therein without departing from the spirit and scope of the invention.

What is claimed is:

1. In a character recognition system including a flying spot scanner for scanning characters to be recognized with a scanning beam, and detector means responsive to the scanning of portion of characters for generating scanning signals, the combination comprising:

at least two clipping level control means connected to said detector means, the first one of said clipping level control means being effective to provide a first output when the amplitude of the scanning signals from said detector means fall within a first predetermined range, and the second one of said slipping level control means being effective to provide a second output when the amplitude of the scanning signals from said detector means fall within a second predetermined range, beam deflection means connected to said flying spot scanner for governing the position of the scanning beam, normally effective in a search mode of operation to cause said beam to scan successive areas in a scanning zone wherein characters to be recognized are presented, and beam position control means effective when said beam encounters a character to connect said deflection means to said clipping level control means to vary the deflection of the scanning beam in first or second increments in accordance with the presence of output signals from said first clipping level control means or said second clipping level control means respectively, to provide registration of the character for subsequent recognition scanning.

2. A combination as disclosed in claim 1, in which the beam deflection means comprises first beam position circuit control means normally effective to move the position of said beam in a first series of increments for character scanning purposes, and second beam control means for moving said beam in a second series of increments, said second beam control means being connected to said clipping level control means.

3. A combination as claimed in clam 2, further including means effective upon the first encounter of the scanning beam with a portion of said character to transfer the operation of said scanner from a search mode to a registration mode and transfer the control of said beam to said first beam position control means and said second beam position control means.

4. A combination as claimed in claim 3 in which the first beam position control means comprises a first digital-to-analog voltage converting means, and said second beam position control means comprises a second digital-to-analog voltage converting means, and circuit means for combining the outputs of said first and said second digital-to-analog converting means, said first and second digital-to-analog converting means having digital inputs thereto derived from digital signals representing the desired position of the scanning beam, and having analog inputs outputs representing voltages proportional to the required beam deflection designated by the digital inputs.

* * * * *